March 4, 1952  P. HARRISON  2,587,844
CAGE AND OPERATING MECHANISM FOR SHAFT SHOVELS
Filed May 19, 1949  4 Sheets-Sheet 1
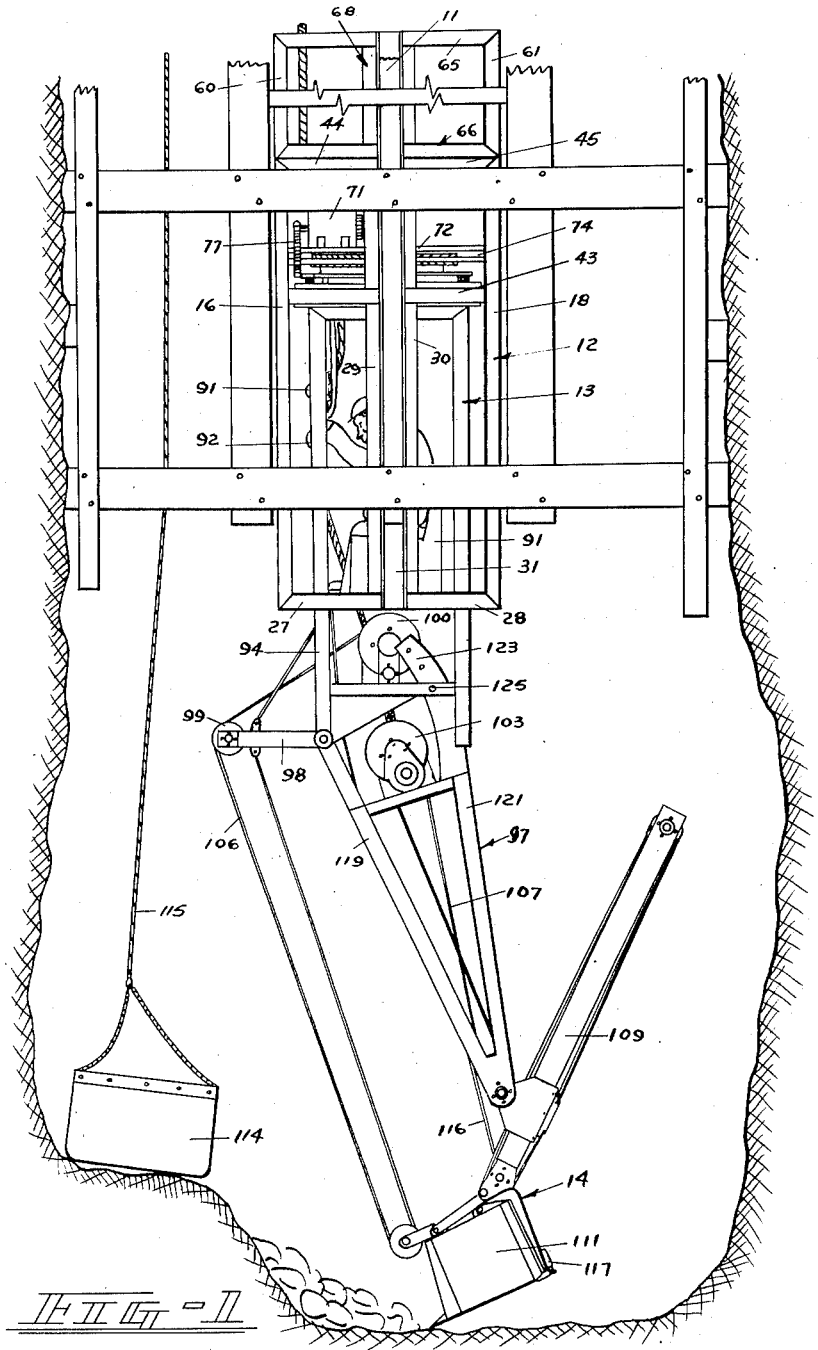
FIG-II
INVENTOR
Patrick Harrison
by Edward N. Fetherstonhaugh
ATTORNEY March 4, 1952  P. HARRISON  2,587,844
CAGE AND OPERATING MECHANISM FOR SHAFT SHOVELS
Filed May 19, 1949  4 Sheets-Sheet 2
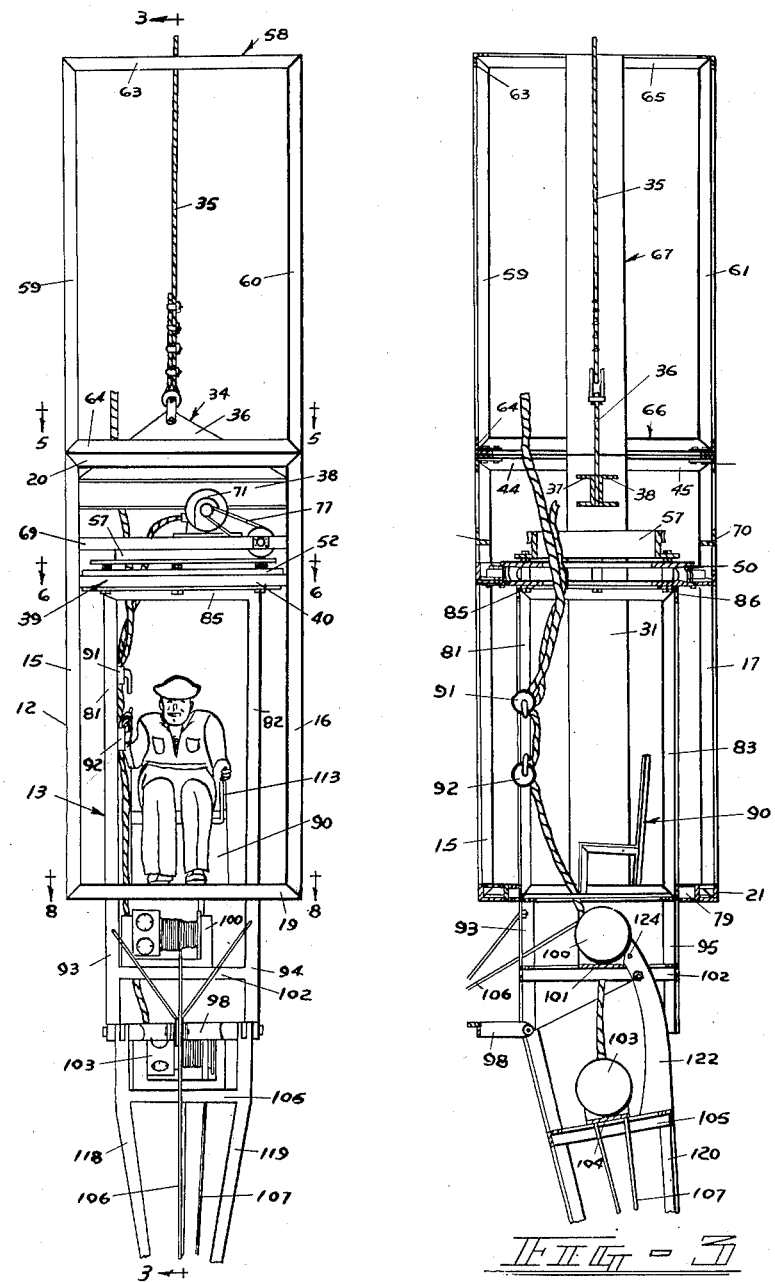
INVENTOR
Patrick Harrison
by Edward N. Fetherstonhaugh
ATTORNEY March 4, 1952 P. HARRISON 2,587,844
CAGE AND OPERATING MECHANISM FOR SHAFT SHOVELS
Filed May 19, 1949 4 Sheets-Sheet 3

INVENTOR
Patrick Harrison
by Edward N. Fetherstonhaugh
ATTORNEY

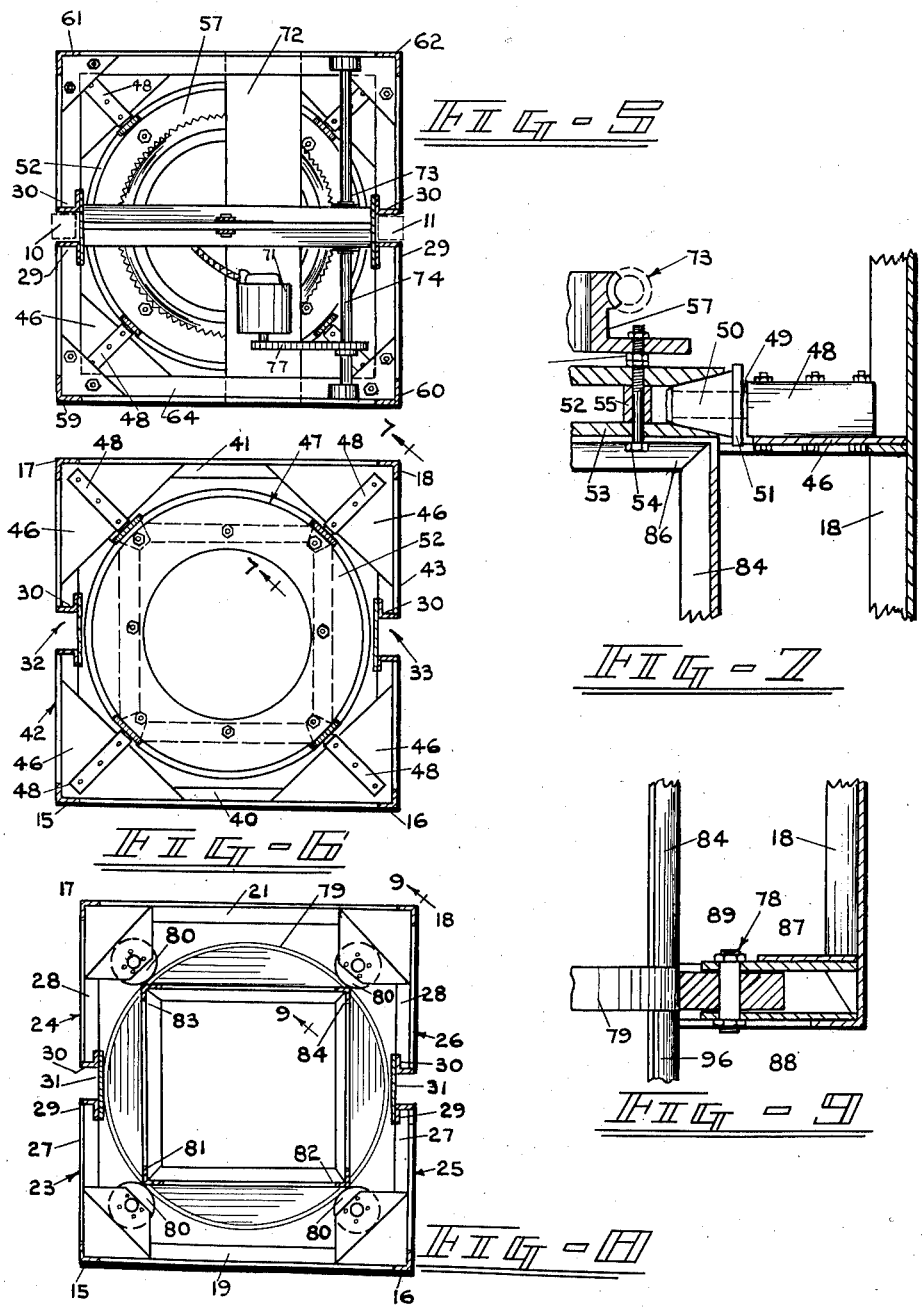

Patented Mar. 4, 1952

2,587,844

UNITED STATES PATENT OFFICE 2,587,844

CAGE AND OPERATING MECHANISM FOR SHAFT SHOVELS

Patrick Harrison, Rouyn, Quebec, Canada

Application May 19, 1949, Serial No. 94,074

4 Claims. (Cl. 214—141)

1

The invention relates to improvements in a cage and operating mechanism for shaft shovels as described in the present specification and illustrated in the accompanying drawings that form a part of the same.

The invention consists essentially of the novel features of construction as pointed out broadly and specifically in the claims for novelty following a description containing an explanation in detail of an acceptable form of the invention.

The objects of the invention are to devise a cage and operating mechanism for shaft shovels adapted for removing earth, broken rock, and other aggregate from vertical passages, tunnels, ventilation passages, waterways and the like; to contrive mechanical means which will facilitate the removal of broken rock and the like in the excavation of vertical shafts; to construct a cage and operating mechanism for shaft shovels which will be simple, with few working parts and inexpensive to manufacture; to furnish a cage and operating mechanism for shaft shovels which may be raised, lowered or rotated and which will be quickly adapted for conveniently positioning the shovel so as to facilitate the removal of rock and other aggregate from vertical passages and the like; and generally to provide a cage and operating mechanism for shaft shovels which will be economical, safe, and efficient for its purpose.

In the drawings:

Figure 1 is a side view showing the cage and operating mechanism supporting the shaft shovel within a partly excavated vertical passage.

Figure 2 is a fragmentary front view showing the cage and operating mechanism which supports the shaft shovel.

Figure 3 is a vertical sectional view as taken on the lines 3—3 in Figure 2.

Figure 5 is a sectional plan view as taken on the line 5—5 in Figure 2.

Figure 6 is a sectional plan view as taken on the line 6—6 in Figure 2.

Figure 7 is an enlarged fragmentary detail as taken on the line 7—7 in Figure 6.

Figure 8 is a sectional plan view as taken on the line 8—8 in Figure 2.

Figure 9 is an enlarged fragmentary detail as taken on the line 9—9 in Figure 8.

Like numerals of reference indicate corresponding parts in the various figures.

Figure 4:
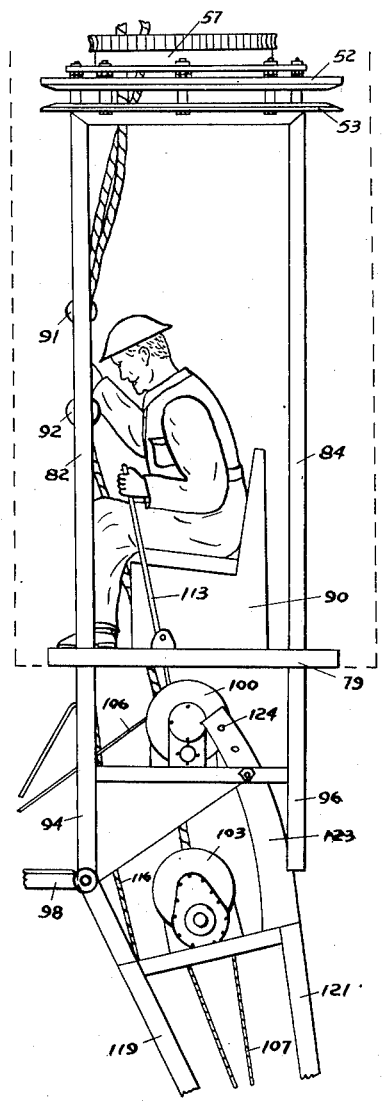
Figure 4 is an enlarged fragmentary side view showing the inner cage removed from the outer cage.

Referring to the drawings, the invention consists of a pair of guide rails as indicated by the numerals 10 and 11, and these guide rails in turn are suitably supported by a plurality of shaft timbers.

An outer cage or structure 12 is engaged by the guide rails 10 and 11 which permits vertical movement of the former within the vertical shaft, and the inner cage or structure 13 is rotatably supported within the outer cage 12 and the components of the shaft 14 are supported by this inner cage. The outer cage 12 is in the form of an angle iron frame, and consists of the front angle uprights 15 and 16 and the rear angle uprights 17 and 18. The front angle uprights 15 and 16 are connected at the lower ends by the bottom front member or angle 19 and at the upper ends thereof by the top front member or angle 20. The rear angle uprights 17 and 18 are connected at the lower end by the bottom rear member or angle 21 and at the upper end thereof by the top rear member or angle 22. The bottom side members 23 and 24 connect the lower ends of the front and rear angle uprights 15 and 17 and the lower ends of the front and rear angle uprights 16 and 18, respectively. Each of these side members 23 to 26 inclusive consist of angle sections 27 and 28 which have their outer ends secured to the their respective front and rear angle uprights. The inner ends of these angle sections 27 and 28 are short of reaching one another thus forming a gap therebetween.

Angle members 29 and 30 extend upward parallel to one another on each side of the outer cage 12. These angle guide members 29 and 30 are fixedly secured to the inner ends of each of the angle sections 27 and 28. A panel strip 31 is fixedly secured to the inner flange on each of the angle guide members 29 and 30 thus forming a connection therebetween, and accordingly completing guide channels 32 and 33 which are located at each side of the outer cage 12 and directly opposite one another. These channels 32 and 33 are engaged by the guide rails 10 and 11 respectively which are rigidly supported within the vertical shaft. A bridle 34 is substantially secured within the upper portion of the outer cage 12 and is adapted to have a cable 35 connected thereto thus providing a means of raising or lowering this outer cage. The bridle 34 consists of a bridle plate 36 which is fixedly secured to the bridle mounting channels 37 and 38. These bridle mounting channels are welded or otherwise secured to the panel strip 31 which forms a part of each of the guide channels 32 and 33.

A turntable support frame 39 is fixedly mounted with respect to the outer cage 12 and consists of intermediate front and rear members 40 and 41, and the intermediate side members 42 and 43. The intermediate front member 40 is secured to the front angle uprights 15 and 16, while the intermediate rear member 41 is connected to the rear angle uprights 17 and 18. The intermediate side members 42 and 43 are similar to the side members 23 to 26 inclusive, and the angle sections 44 and 45 forming a part of these intermediate side members are suitably secured to the angle guide members 29 and 30.

Gusset plates 46 are fixedly mounted in each corner of the outer cage 12 and provides a means of supporting the turntable 47. These gusset plates 46 are suitably supported by the angle uprights 15 to 18, the intermediate front and rear members 40 and 41 and the intermediate side members 42 and 43.

A block 48 is mounted on each of the gusset plates 46 in each corner of the outer cage 12 and each of these blocks 48 have a roller pin 49 secured therein and extending outward therefrom. Each of these roller pins 49 having a tapered roller 50 rotatably mounted thereon. This tapered roller has an annular rim 51 extending around the rear portion thereof and the body of the tapered roller extends between and inward therefrom. Each of the roller pins 49 which extend through the tapered rollers 50 are upset on the ends thereof thus rotatably retaining the tapered rollers in position with respect to the blocks 48 and gusset plates 46.

The turntable 47 consists of an upper and lower circular plate 52 and 53. The inner faces of the upper and lower circular plates 52 and 53 are tapered outward towards the periphery thereof so as to coincide with the tapered rollers 50, and the lower circular plate 53 is fixedly secured to the top of the inner cage 13 by means of the bolts 54. These bolts 54 extend upward through spacers 55 dividing the upper and lower circular plates 52 and 53 and the nuts 56 which are tightened down on the bolts 54 hold the entire assembly of the turntable 47 substantially together. The bolts 54 are sufficiently long to extend upward past the nuts 56 thus providing a means of mounting a gear wheel or ring 57 securely in position.

The outer cage extension 58 consists of front angle uprights 59 and 60 and rear angle uprights 61 and 62. The upper and lower cross angles 63 and 64 connect the upper and lower ends of the front angle uprights 59 and 60; while the upper and lower side members 65 and 66 connect the upper and lower ends of the front and rear angle uprights 59 and 61, and the front and rear angle uprights 60 and 62. These side members 65 and 66 are similar to the side members 23 to 26 inclusive and accordingly form the angle guide members 67 and 68 which engage the guide rails 10 and 11.

The front and rear support angles 69 and 70 are secured to the front angle uprights 15 and 16, and rear angle uprights 17 and 18, respectively, and provide a means of mounting a motor 71 which is adapted to provide power for rotating the inner cage. A support plate 72 is fixedly mounted on the front and rear support angles 69 and 70 and the motor 71 in turn is mounted on this support plate. A worm 73 is mounted on a shaft 74 which, in turn, is rotatably supported on the front and rear support angles 69 and 70. This worm 73 is rotated by the motor 71 which is connected by a belt 77. The worm 73 engages the gear wheel 57 which is fixedly mounted on the top of the inner cage 13 and operation of the motor in either direction rotates this inner cage within the outer cage 12.

The lower portion of the inner cage 13 is guided within the outer cage 12 by means of a guide roller assembly 78. This guide roller assembly consists of a circular platform 79, which forms the bottom portion of the inner cage 13, and a plurality of guide rollers 80 are rotatably mounted with respect to the outer cage 12 and adapted to engage the periphery of this circular platform. Front angle uprights 81 and 82 and rear angle uprights 83 and 84 are suitably secured with respect to the circular platform 79 and extend upward therefrom. The upper ends of the angle uprights 81 to 84, inclusive, are connected by the front and rear cross angles 85 and 86 and the turntable 47 is fixedly supported above these cross angles. The guide rollers 80 are rotatably mounted on pins 89 which in turn, are supported between the gussets 87 and 88 which are welded or otherwise secured to the angle uprights 15 to 18 inclusive. An operator's chair 90 is suitably mounted on the circular platform 79, and the controls 91 and 92 are mounted on the front angle uprights 81 above this chair. A frame extension is secured to the bottom of the inner cage and consists of a pair of front vertical supports 93 and 94 and a pair of rear vertical supports 95 and 96. These vertical supports 93 to 96 inclusive, extend downward from the circular platform 79 and forms a part of the inner cage 13. The vertical supports 93 to 96 inclusive provide a means of substantially mounting the shaft shovel 14. The swinging boom 97 is suitably secured to the lower end of the vertical supports 93 to 96, inclusive, and extend downward therefrom. The front arms 118 and 119 of the swinging boom 97 are pivotally secured to the lower ends of the front vertical supports 93 and 94, and the rear arms 120 and 121 of the swinging boom having extension members 122 and 123 secured to the upper portions thereof. These extension members 122 and 123 extend upward and forward in an arcuate manner from the rear arms 120 and 121 and are provided with adjustment holes 124. These adjustment holes 124 in the extension members 122 and 123 permit the swinging boom 97 to be adjustably supported in various positions. In this instance the fastening bolts 125 are engaged in any of the adjustment holes for securing the rear portion of the swinging boom to the rear vertical supports 95 and 96. A hinged pulley boom 98 is pivotally secured at the junction of the front vertical supports 93 and 94 and the upper ends of the swinging boom 97. This hinged pulley boom extends outward from the upper end of the swinging boom 97 and has a pulley 99 rotatably mounted on the outer end thereof. A hoist 100 is suitably mounted on a plate 101 which is supported between the vertical supports 93 to 96 inclusive, by means of support angles 102. This hoist is suitably connected to a cable 106 which passes over the pulley 99 on the hinged pulley boom 98 and extends downward to operate the shovel 111. A hoist 103 is mounted on the plate 104 which, in turn, is supported between the upright members of the swinging boom 97 by means of the support angles 105. The hoist 103 is connected to the crowding mechanism of the dipper stick 109 by means of the cable 107. In this respect the hoist 103 actuates the dipper stick 109, while the hoist 100 raises and lowers the shovel 111, which in turn, is suitably secured to the end of this dipper stick.

The outer cage 12 is raised or lowered by any suitable power means connected to the cable 35, and during the movement of this outer cage the same is guided by means of the guide rails 10 and 11 engaging with the guide channels 32 and 33 on this cage. The inner cage 13 is supported vertically by means of the outer cage 12 and is permitted to be rotated within this outer cage by means of the motor 71, which is controlled by the two-way valve 91. The dipper stick 109 may be either retarded or advanced with respect to the swinging boom 97 by means of the hoist 103 which is controlled by the two-way valve 92. The shovel 111 is raised by means of the hoist 100, which in turn, is controlled by the lever 113. The tub 114 has a cable 115 connected thereto which extends upwards to the top of the shaft so that the same may be raised or lowered by any suitable surface equipment. A cord 116 is connected to the latch 117 on the back of the shovel 111 and extends upward to the operator's cage.

In removing rock, and aggregate from within the vertical shaft, the operator may raise and lower the inner and outer cage thus determining the vertical position of the shaft shovel and at the same time he may rotate the inner cage within the outer cage so as to turn this shaft shovel in the desired direction to facilitate the excavation. After the position of the shaft shovel has been adjusted vertically and directionally, the operator commences the excavation by suitably retarding or advancing the position of the dipper stick and at the same time suitably raising the shovel so as to break up rock and aggregate. The shovel is moved to a position directly above the bucket while the same may be tripped by means of the cord which is connected to the latch on same. The bucket may then be raised to the surface so as to permit the disposal of the rock, and aggregate contained therein, and these operations are then repeated until the excavation of the vertical shaft has been completed.

What I claim is:

1. A cage and operating mechanism for shaft shovels, a plurality of shaft timbers suitably supported in a vertical shaft, vertical guide rails supported by said shaft timbers, an outer cage accommodated within the vertical shaft, guide channels on the sides of said outer cage adapted to be engaged by said vertical guide rails, a cable means connected to said outer cage permitting the same to be raised or lowered, an inner cage accommodated within said outer cage, a turntable mounted above said inner cage, support rollers rotatably mounted within said outer cage and supporting said turntable, a gear wheel fixedly secured above said turntable, a motor supported by said outer cage, a worm driven by said motor and engaging said gear wheel for rotating said inner cage in either direction with respect to said outer cage, a circular platform forming the bottom of said inner cage, guide rails rotatably mounted in the lower portion of said outer cage and engaging said circular platform, a swinging boom pivotally secured at the front thereof to the lower end of said inner cage, an extension formed on the rear upper portion of said swinging boom, said extension having a plurality of adjustment holes therein and suitably spaced apart, fastening bolts securing said extensions on said swinging boom to the lower portion of said inner cage, and said swinging boom being adjustable with respect to said inner cage by securing the extensions thereof through any of the adjustment holes therein, a shovel arrangement movably supported on the lower end of said swinging boom, and hoists effecting a scooping action in said shovel arrangement, an operator's chair suitably supported within said inner cage and control means within said inner cage suitably located with respect to said operator's chair.

2. In a cage and operating mechanism for shaft shovels, a plurality of shaft timbers suitably supported in a vertical shaft, vertical guide rails supported by said shaft timbers, an outer cage, guide channels on the sides of said outer cage adapted to be engaged by said vertical guide rails, a cable means connected to said outer cage permitting the same to be raised or lowered, an inner cage accommodated within said outer cage, a turntable mounted above said inner cage, said turntable comprising an upper circular plate and a lower circular plate, said upper circular plate and said lower circular plate suitably spaced apart and having an annular tapered portion extending outward towards the periphery thereof, the annular tapered portion on each of said circular plates facing one another to form outwardly tapering annular jaws, gussets mounted in each corner of said outer cage, tapered rollers suitably mounted on said gussets and extending inward to engage in the annular tapered jaws formed by said upper and lower circular plates of said turntable, and guide rollers rotatably mounted in the lower portion of said outer cage and engaging said inner cage, a swinging boom secured to the lower portion of said inner cage and extending downward therefrom, a shovel arrangement movably supported on the lower end of said swinging boom, a motor rotating said inner cage in either direction with respect to said outer cage, and hoists effecting a scooping action in said shovel arrangement.

3. In a cage and operating mechanism for shaft shovels, a plurality of shaft timbers suitably supported in a vertical shaft, vertical guide rails supported by said shaft timbers, an outer cage, guide channels on the sides of said outer cage adapted to be engaged by said vertical guide rails, a cable means connected to said outer cage permitting the same to be raised or lowered, an inner cage accommodated within said outer cage, a turntable mounted above said inner cage, said turntable comprising an upper circular plate and a lower circular plate, said upper circular plate and said lower circular plate suitably spaced apart and having an annular tapered portion extending outward towards the periphery thereof, the annular tapered portion on each of said circular plates facing one another to form outwardly tapering annular jaws, gussets mounted in each corner of said outer cage, tapered rollers suitably mounted on said gussets and extending inward to engage in the annular tapered jaws formed by said upper and lower circular plates of said turntable, and said tapered rollers rotating in a vertical plane thus rotatably supporting said inner cage below said turntable and at the same time providing lateral guide means, a pair of gussets fixedly secured in each corner of said outer cage at the bottom thereof, guide rollers rotatably supported between each pair of said gussets, a circular platform forming the lower floor of said inner cage and said guide rollers rotating in a horizontal plane and engaging the periphery of said circular platform, a swinging boom secured to the lower portion of said inner cage and extending downward therefrom, a shovel arrangement movably supported on the lower end of said swinging boom, a motor rotating said inner cage in either direction with respect to said outer cage, and hoists effecting a scooping action in said shovel arrangement.

4. A cage and operating mechanism for shaft shovels, a plurality of shaft timbers suitably supported in a vertical shaft, vertical guide rails supported by said shaft timbers, an outer cage accommodated within the vertical shaft, guide channels on the side of said outer cage adapted to be engaged by said vertical guide rails, a cable means connected to said outer cage permitting the same to be raised or lowered, an inner cage accommodated within said outer cage, a turntable mounted above said inner cage, support rollers rotatably mounted within said outer cage and supporting said turntable, a gear wheel fixedly secured above said turntable, a motor suitably supported by said outer cage, and a worm driven by said motor and engaging said gear wheel for rotating said inner cage in either direction, a frame extension, a swinging boom suitably supported by said frame extension, a shovel arrangement movably supported on the lower end of said swinging boom, said shovel arrangement comprising a dipper stick and a shovel, a hoist supported by said swinging boom for retarding or advancing the position of said dipper stick, a second hoist supported by said frame extension for raising said shovel and the position of said dipper stick adjacent thereto thus effecting a scooping action in said shovel arrangement.

PATRICK HARRISON.

REFERENCES CITED

The following references are of record in the file of this patent:

UNITED STATES PATENTS

| Number | Name | Date |
|---|---|---|
| 553,082 | Thew | Jan. 14, 1896 |
| 2,326,172 | Riddell | Aug. 10, 1943 |
| 2,426,591 | Boskovich | Sept. 2, 1947 |
| 2,492,217 | Grismer | Dec. 27, 1949 |